US008238000B2

(12) United States Patent
Van Der Heijden

(10) Patent No.: US 8,238,000 B2
(45) Date of Patent: Aug. 7, 2012

(54) METHOD AND APPARATUS FOR CALIBRATING A TRANSPORT SCANNER AND A TEST ORIGINAL FOR USE WITH SUCH METHOD

(75) Inventor: Gerardus J. E. L. Van Der Heijden, TM Venlo (NL)

(73) Assignee: Oce-Technologies B.V., Venlo (NL)

( * ) Notice: Subject to any disclaimer, the term of this patent is extended or adjusted under 35 U.S.C. 154(b) by 1241 days.

(21) Appl. No.: 10/717,510

(22) Filed: Nov. 21, 2003

(65) Prior Publication Data
US 2004/0150861 A1 Aug. 5, 2004

(30) Foreign Application Priority Data

Nov. 28, 2002 (EP) ..................................... 02080015

(51) Int. Cl.
*H04N 1/047* (2006.01)
(52) U.S. Cl. ......... 358/504; 358/406; 358/474; 358/505
(58) Field of Classification Search .................. 358/500, 358/505, 504, 483, 409, 412, 406
See application file for complete search history.

(56) References Cited

U.S. PATENT DOCUMENTS

| | | | | |
|---|---|---|---|---|
| 5,245,440 A * | 9/1993 | Sato | ............................... | 358/406 |
| 5,510,896 A | 4/1996 | Wafler | | |
| 6,005,587 A | 12/1999 | Takahashi et al. | | |
| 6,016,207 A * | 1/2000 | Wield | ............................. | 358/406 |
| 6,222,934 B1 | 4/2001 | Tsai | | |
| 6,226,419 B1 * | 5/2001 | Lodwick et al. | ............... | 382/294 |
| 6,295,386 B1 * | 9/2001 | Ryu | ............................... | 382/294 |
| 6,307,579 B1 | 10/2001 | Kida | | |
| 6,411,405 B1 * | 6/2002 | Yun et al. | ........................ | 358/488 |
| 6,624,876 B2 * | 9/2003 | Fukuda et al. | ................... | 355/29 |
| 7,106,477 B2 * | 9/2006 | Horobin | ........................... | 358/1.9 |
| 7,212,312 B2 * | 5/2007 | Motamed | ........................ | 358/1.9 |

FOREIGN PATENT DOCUMENTS

JP 7-162604 A 6/1995

OTHER PUBLICATIONS

Meeder et al., "Test for Evaluating Laser Film Digitizers", Medical Physics, American Institute of Physics, vol. 22, No. 5, May 1, 1995, pp. 635-642, XP000518762.

(Continued)

*Primary Examiner* — King Poon
*Assistant Examiner* — Lawrence Wills
(74) *Attorney, Agent, or Firm* — Birch, Stewart, Kolasch & Birch, LLP

(57) ABSTRACT

A method for geometrically calibrating a transport or feed through a scanner apparatus, arranged for scanning a two-dimensional original for subsequent usage in an appropriate information handling system, wherein a test original is presented which has been provided with an image for the purpose of deriving a scanned image therefrom. The method uses the test original provided with a test image featuring a leading image edge and a trailing image edge at a predetermined and known parallel displacement with respect to each other, and automatically detects therefrom a calculated first correction value for the zoom factor in the transport direction or transport speed, a calculated second correction value for the leading edge position, and a calculated third correction value for the trailing edge position. Thereupon, the first, second and third correction values are updated in the scanner apparatus in accordance with the measured values therefor.

8 Claims, 5 Drawing Sheets

OTHER PUBLICATIONS

Meeder et al., "Test for Evaluating Laser Film Digitizers", Medical Physics, American Institiute of Physics, vol. 22, No. 5, May 1, 1995, pp. 635-642, XP000518762.

Morgan, P.F., "Scanhead Calibrating Strip in DH Belt", Xerox Disclosure Journal, Xerox Corporation, vol. 16, No. 1, 1991, p. 67, XP000168280.

* cited by examiner

METHOD AND APPARATUS FOR CALIBRATING A TRANSPORT SCANNER AND A TEST ORIGINAL FOR USE WITH SUCH METHOD

This non-provisional application claims priority under 35 U.S.C. §119(a) on Patent Application No. 02080015.7 filed in Europe on Nov. 28, 2002, which is herein incorporated by reference.

BACKGROUND OF THE INVENTION

1. Field of the Invention

The present invention relates to a method for 1:1 format size or for the geometric calibrating of a feed through scanner or transport scanner that is arranged for scanning a two-dimensional original and forming an electronic image for subsequent usage in an appropriate information handling system. The scanning and forming steps are executed under the control of device parameters and the method includes the steps of scanning a test original, provided with a test image and then forming an electronic image. The invention also relates to an apparatus having a transport scanner facility and a test original for use with the present method.

2. Related Art

Transport or feed through scanners are being used for deriving a complete and conforming image from an original, either for the purpose of immediate copying thereof, or for intermediate storage with an intention to later usage of the information for manipulation and/or eventual delayed copying or printing. In particular, but not by way of limitation, the original may have an appreciable size such as an A0 or A1 format, and may even stretch out in one direction, such as in the form of a semi-infinite roll. On the other hand, the original may also have quite a smaller size. The content of the image is inconsequential, but various applications may range from cartography to mechanical engineering. Such transport scanner distinguishes from a so-called flat-bed scanner in that in the former the original moves along a fixed optical arrangement of the apparatus that usually is realized as an array of CCD elements which runs generally transverse to the direction of motion of the original.

Now, various geometrical uncertainties will exist in the apparatus as recited, where against both the size and the timing of the array of CCD elements would need calibration. Furthermore, also the transport mechanism and the precise location of the original in a transverse direction to the transport vector would justify effort for precise calibration. All these calibrations are relative to the standard size original that would effectively be used. The problem is aggravated in that the transport mechanism and the geometrical scaling of the image by the optical arrangement are governed by quite different control mechanisms. Particular problems are caused by uncertainties in the leading edge position and trailing edge position of the original and in the transport speed vis-à-vis the optical arrangement.

Current practice with such transport scanners has been to provide such standard size original, to make a copy thereof, and to have any necessary calibrations applied to the scanner facility by a skilled technician. The ongoing advance of technology and its rising degree of sophistication, and furthermore the increasing usage of such transport scanners have made the necessity for such manual calibration an appreciable burden, both in terms of cost and in terms of delays incurred, in particular when the scanner may be subject to temporal drifting.

Moreover, according to prior practice, generally an already adjusted printer must be present in the overall system, which may necessitate taking recourse to a remote facility. A further problem will be met when the scanner is not locally connected to an actual printer or copier facility, which may then be present instead in a remote location, or be only available after an appreciable delay.

SUMMARY OF THE INVENTION

Accordingly, it is an object of the present invention to provide a calibrating method to be used in a semi-automatic, secure, and fast manner and without the need for actually making a physical copy of the original.

The carrier of the test original may be made of a material that has a very conforming and constant size, and the image applied thereon may be shaped in such a way as to allow maximum accuracy. In this way, the invention will provide for appropriate correction values to be applied to the leading edge position, the trailing edge position, and the transport speed or motor speed. It is noted that the zoom factor in the transport direction and the transport speed have a linear relationship with respect to each other and are, as far as the invention is concerned, mutually interchangeable.

By itself, U.S. Pat. No. 5,245,440 to Sato presents a calibration carrier provided with a calibration image, but the shape of the image includes various slanted edges and the subsequent calibration procedures provide pulses relating to single pixels (cf. X1, X2 in FIG. 6B of Sato) and do not provide the combination of automatic execution and high accuracy attainable by the calibration method of the present invention. In fact, an advantageous aspect of the present invention's calibration is based on effecting the measurement on a plurality of pixels, so that possible degradations or variations of a few would cancel or average out in the final result.

The present invention also relates to an apparatus which is arranged for implementing the present method and to a test original provided with an image for interfacing with such an apparatus.

In particular, an extended version of the calibration according to the present invention will additionally approach the scanline width deviation or horizontal zoom correction, and also, or as an alternative, the left margin alignment or the alignment of the detector array with the right alignment stop position. Note that in general, the notions "left" and "right" may be mutually interchangeable.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
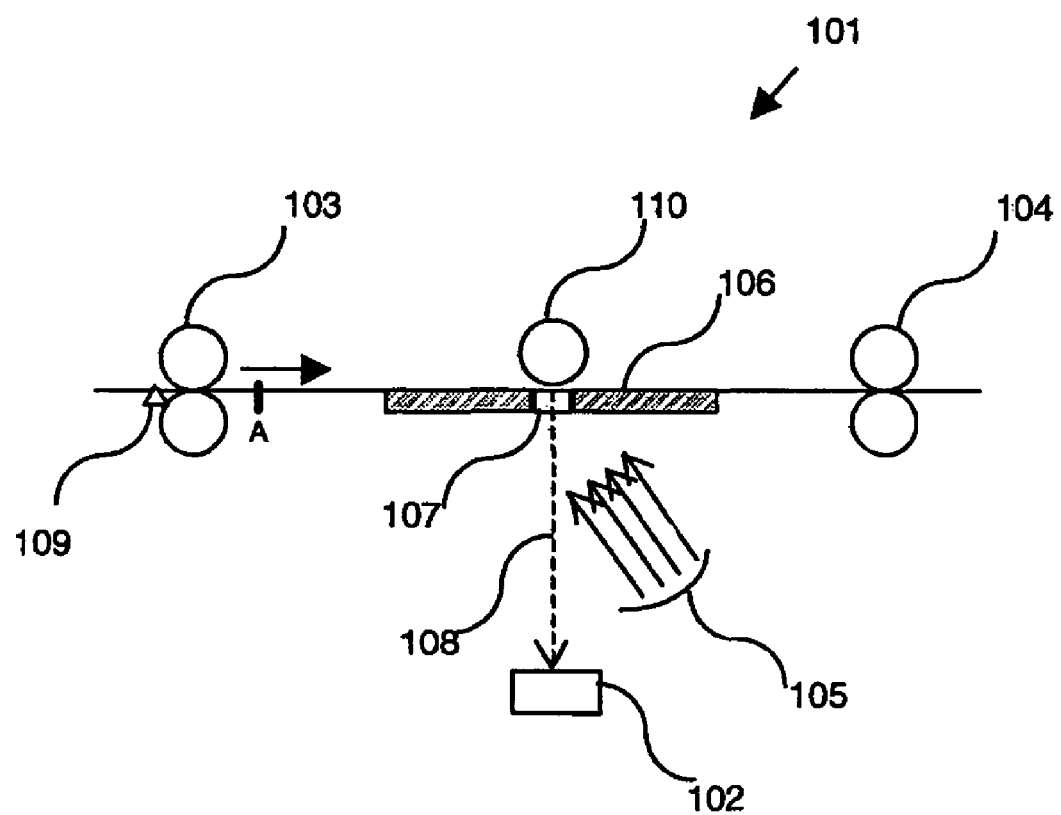
FIG. 1 is an exemplary sketch of the functional paper path applied in a scanner system.

FIG. 1 presents a schematic cross-sectional view of a scanning device. The scanning device shown is particularly adapted to scan large format documents such as blueprints and the like. The device 101 comprises a linear CCD array 102, two pairs of transport rollers 103 and 104 for transporting an original sheet in the indicated transport direction, a light source 105, a platen 106 for guiding the original sheet, a slit 107 in the platen for forming an oblong exposure area perpendicular to the transport direction, and an optical path 108 for projecting an image at the exposure area onto the CCD array. Furthermore, a sheet sensor 109 and a gauge roll 110 are provided. The sheet sensor 109 is in the ON state when a sheet is present at the detector and is in the OFF state when no sheet is present at the detector.

In operation, when a sheet is positioned against the nip of roller pair 103 by an operator, the sheet sensor switches to the ON state, whereupon the roller pair, after a short delay, makes a part of a turn in such a way that the sheet is pulled in over a short distance. This will effectively free the hands of the operator. The leading edge of the original sheet is then at position A, which is at a distance of Lstart from the center of the exposure area. After activation of the start button, the original sheet is transported along the platen and across the exposure area with a predetermined velocity. Naturally, after starting the transport, movement acceleration will take place, but this initial phase is understood to have terminated when the leading edge of the original passes the exposure area. The light source illuminates the original sheet at the exposure area. An image line of the original document at the image plane is projected via the optical path on the CCD array. Electrical signals generated in the elements of the CCD array in correspondence with the line image at the exposure area are read out in parallel and placed in a line buffer. The line buffer is serially read out for transport to an electrical circuit for further processing. After appropriate processing the resulting pixels are stored in memory as an electronic image in the format of a bitmap. The gauge roll allows, in cases where the light source is turned on and no original sheet is present at the exposure area, to measure and compensate for CCD sensitivity, such as against non-uniformity thereof.

FIG. 1 does not show various optical aspects of the embodiment, such as the exact shape of lenses and mirrors, but such may be dimensioned according to the general state of the art. In normal mode, reading out of the CCD-array signals starts at the moment the leading edge of the original sheet passes the exposure area. In a calibration mode, reading out of the CCD-array signals starts at the moment the original sheet (test original) starts transporting from its initial position A.

The scanning device is governed by a number of scanner or device parameters that control the process of making a mapping from the image on paper to a bitmap image in memory. These parameters are mainly determined by the design of the scanning device. However, due to inaccuracies, e.g. at production when assembling the device, or due to environmental circumstances, parameters may deviate from intended values.

Consequently, the bitmap of a scanned image will not be an exact copy of the original image. The method according to the present invention analyzes the bitmap image, resulting from the test original, derives differences from the intended values, and calculates correction values for the respective parameters. Upon correction of these parameters, the conversion process from the image on a page to the image in memory will result in a true mapping, despite differences, in particular, instances of the scanning devices.

Figure 2:
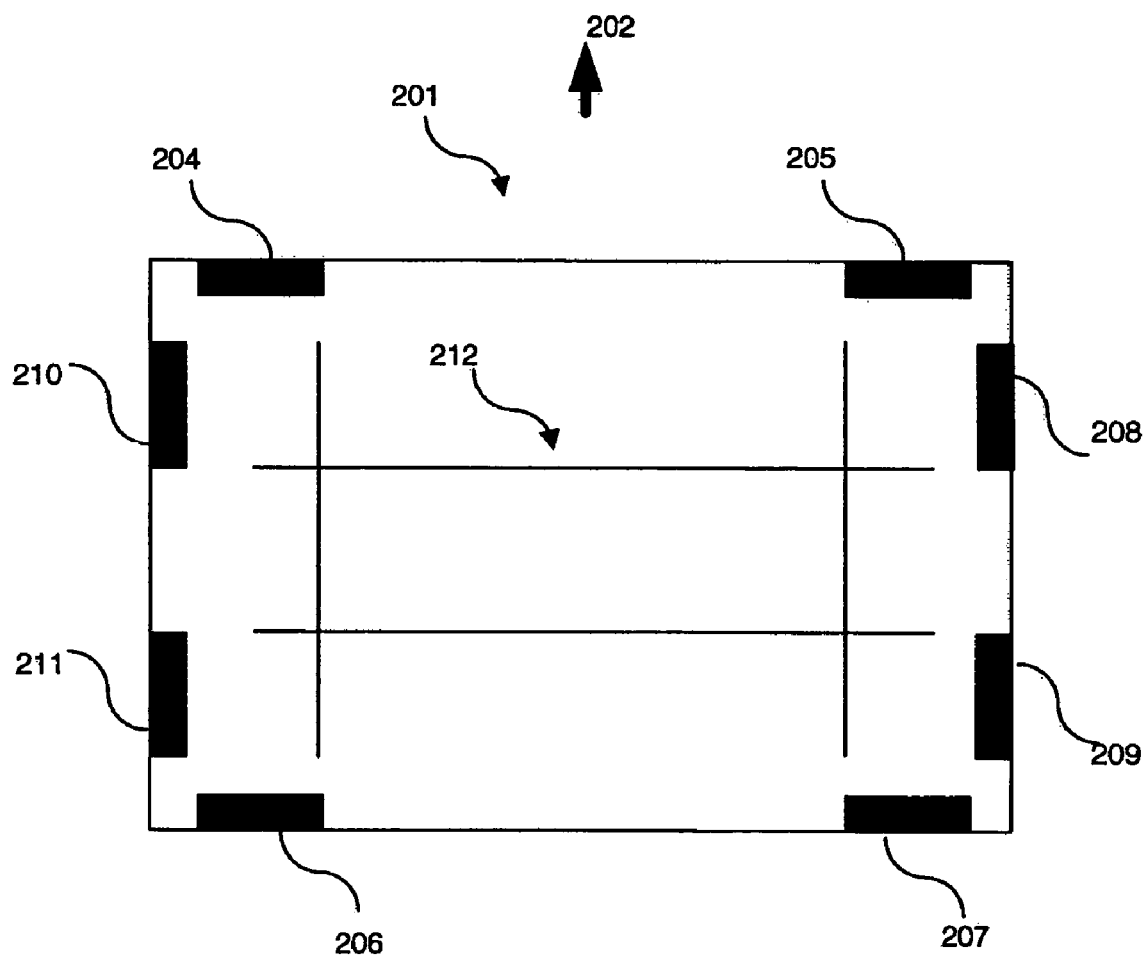
FIG. 2 is a stylistic drawing of a test original embodiment.

FIG. 2 presents a stylistic drawing of a test original embodiment. The test original 201 is of generally rectangular disposition, and is made of a material, such as a polyester, that has a very conforming and constant size. In the present embodiment, it is fed into the scanner facility in the direction of bold arrow 202. The test original has four edges. Adjacent edges are accurately perpendicular and opposing edges are accurately parallel to each other. Furthermore, each of the four edges of the test original has two rectangular, darkly colored shapes or markings (204, 205, 206, 207, 208, 209, 210 and 211), that ideally are black and have identical sizes. However, other colors and shapes may, in principle, be available to skilled practitioners, provided that certain accurately detectable sides are present for calibration. These dark rectangular shapes run flush with the edge of the test original. In fact, their outer side is formed by the process of cutting off the test original, so that their tolerance is only the cutting-off tolerance. Blocks 204 and 205 are at the leading edge of the test original. Blocks 206 and 207 are at the trailing edge of the test original.

Furthermore, a line pattern 212 is applied, as shown to the test original, that forms a further rectangle disposed between the edges of the various dark shapes. These lines, and in particular, their various crossing points, can be used as specific measurement points for the horizontal and vertical zoom factors of the CCD timing and control, as will be disclosed more in detail hereinafter.

As step in the calibration procedure the test original is scanned in and stored as a bitmap in memory.

Now, the sensing pixels will present synchronous clocked signals that will be digitized by an arrangement not shown. On meeting the side of shape 204, the sensing pixels will more or less stepwise see their signals change from "white" to "black". For calculating the position of the edge, binarization may be effected before or after processing. In addition, interpolation of the blackness values between successive clock cycles may be effected before digital processing. In an initial stage, non-conforming pixel values may be dropped from further consideration. All of the above will present a black/white edge with a granularity of at most one vertical pixel period. The processing may take the corresponding signals from paired dark region 205 into account in an appropriate stage of the calibration calculation.

Concerning the with dark shape 210, here the outer edge will be detected by only a few pixels at a time, but various successive clock cycles will all feature the same position detection. In consequence, with respect to dark shape 204, the corroboration along an outer edge detected is lateral and spatial, whereas interpolation across the same edge is vertical and temporal. In contradistinction, for dark shape 210 the corroboration along the outer edge is vertical and temporal, whereas the interpolation across the same edge is horizontal and spatial. In general, only the outer edges of the eight dark shapes need to be used for calibration. However, in certain situations also the inner edges of the shapes could be used. Likewise, the shape of the line pattern 212, and in particular, the locations of the cross points therein, can be used for deriving all calibration data therefrom.

Figure 3:
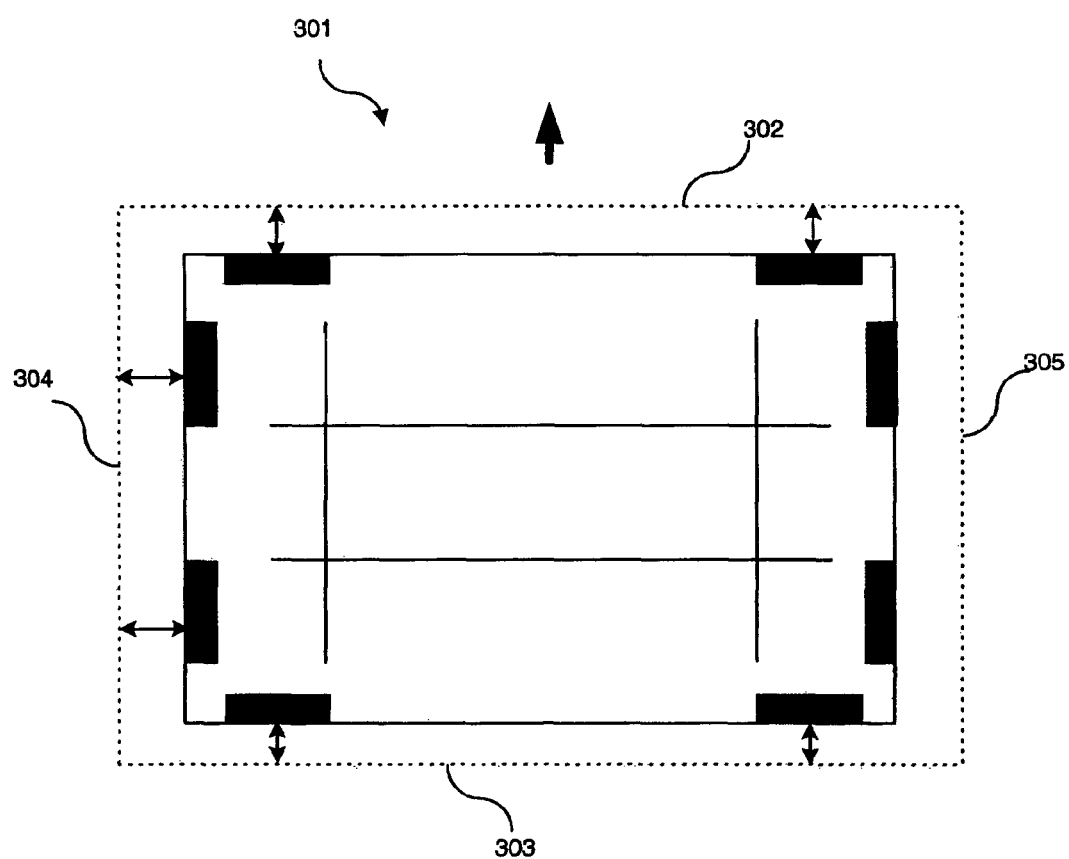
FIG. 3 is an image in memory resulting from scanning the test original.

FIG. 3 gives a representation of the resulting bitmap in memory. The dashed lines present the borderlines of the total scan area. The total scan area, when a calibration scan according to the present invention is carried out, is bigger than the total scan area used for normal scans. Line 302 is the first scan line received from the CCD; line 303 corresponds with the last scan line received from the CCD; borderlines 304 and 305 correspond with the signals from the first and last operative CCD-element of the array.

Carrying out a calibration scan is started when the operator presses the start button. This leads, at the same time, to activation of the feed rollers that start feeding the original, and reading out of the CCD-array, although at this initial moment the leading edge of the test original is still at position A. The last line 303 of the scan area is read out after a lapse of a predetermined time interval, after deactivation of the sheet sensor 109, in such a way that also the trailing edge of the test original has passed along the CCD-array.

Figure 4:
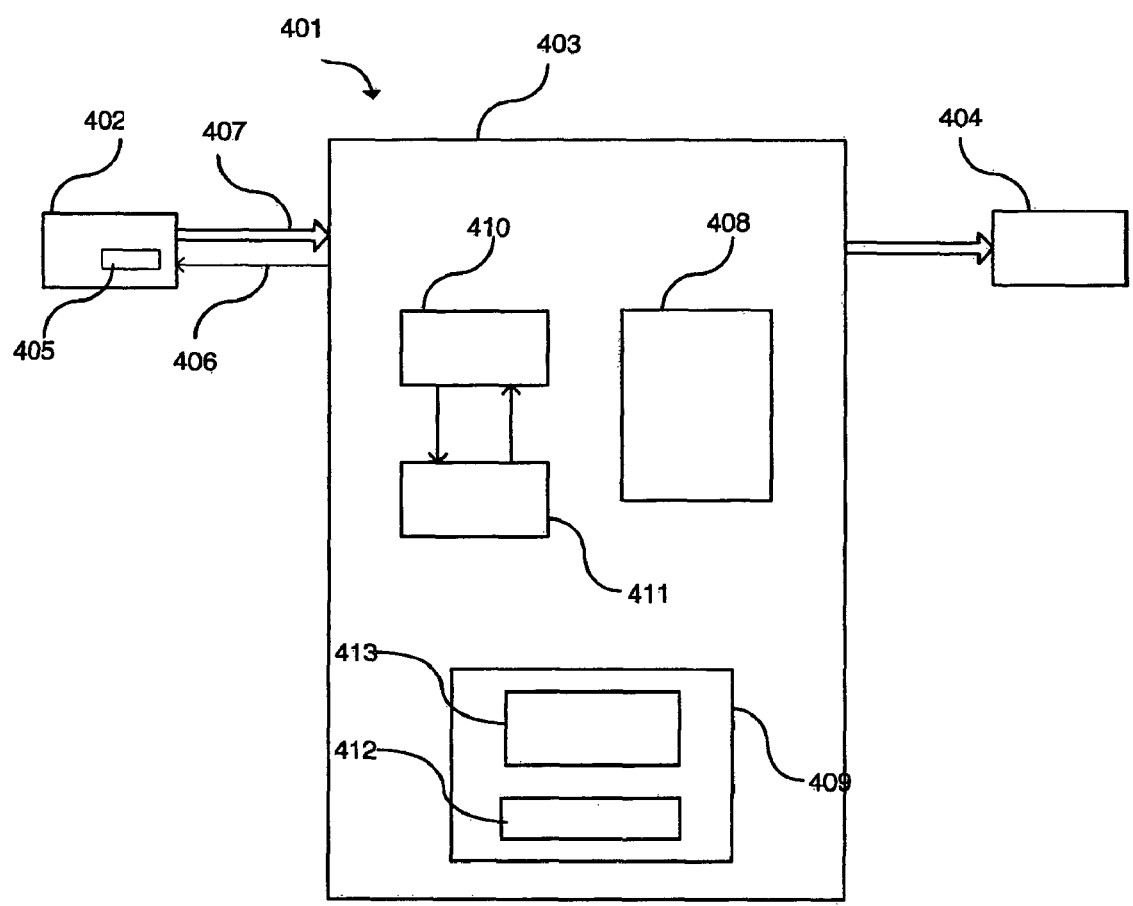
FIG. 4 is a simplified component diagram of a reproduction device of the present invention.

The present invention will now be illustrated by application of the method according to the present invention in a reproduction apparatus. It is evident, however, that the application of the method according to the present invention in a stand alone scanner is possible as well, or in a scanner in combination with any kind of processing device, where the scanner for calibration purposes is temporarily coupled to the processing device. FIG. 4 provides an architectural overview of a reproduction apparatus adapted to carry out the method according to the present invention. The reproduction apparatus 401 comprises a scanner unit 402, a controller module 403, and a printer unit 404. The scanner unit 402 comprises a memory 405 for the storage of scan parameters. The scanner unit is connected to the controller unit by a bi-directional control line 406 and a data line 407. Scanned image data is delivered, line by line to the controller via the data line. The controller module includes a memory unit 408 and a user interface unit 409. Above that, the controller module is adapted to execute a number of software programs to perform its tasks. Indicated are a calibration program 410 and an analysis program 411. The memory unit 408 comprises a first memory area for storing a scanned image as a bitmap delivered line by line via data line 407 and a second memory area for storing a logfile of the calibration procedure. User interface unit 409 comprises a key panel or keyboard 412 containing a start button, and a display 413.

The calibration procedure is as follows. The calibration is initiated e.g. from key panel 412. Such initiation may be effected upon a request by an operator, which need not be a specially skilled and trained calibrator technician. The calibration program 410 will be invoked, and a command is passed on to the scanner through command line 406. This procedure will bring the scanner to the calibration mode and the scanner will be prepared for scanning the test original shown in FIG. 2. An appropriate message may be given on display 413 of the user interface unit to suggest to the operator to apply the test original and press the start button. After the operator has inserted the test original and has pushed the start button, the test original is scanned and the scan bitmap data are passed on to the controller through data channel 407 and are stored in the first memory area.

When the complete bit map has been received successfully the calibration program invokes the analysis program 411 according to the present invention and starts analyzing the bitmap. When the program has calculated the relevant parameters, and the analysis status succeeded, the associated parameters are returned. The parameters are passed to the scanner 402 as a calibration parameter set through interface 406, where they are stored in memory 405. The latter step will allow for denial by the scanner, for example, if one or more of the parameter values falls outside of an allowed range therefor. Absent such a denial, the overall procedure will be successfully concluded. The scanner parameters are updated in a data base sds_log.mdb in a second part of memory 408. The program will report the test status as completed, and the apparatus will return to a normal user mode.

The outcome of the analysis program is composed of the following parameter values that result from the various analysis calculations:
  leading_edge_val+, the calculated correction value for the leading edge position;
  trailing_edge_val+, the calculated correction value for the trailing edge position;
  ver_zoom_corr_val+, the calculated correction value for the vertical zoom, or motor speed versus image length;
  hor_zoom_corr_val+, the calculated correction value for the horizontal zoom or image width;
  left_edge_align_val, the calculated correction value for the left margin position.

In the above, the left_edge_align value may be omitted, inasmuch as such a tolerance would only cause a lateral shift of the image without further distortions.

Figure 5:
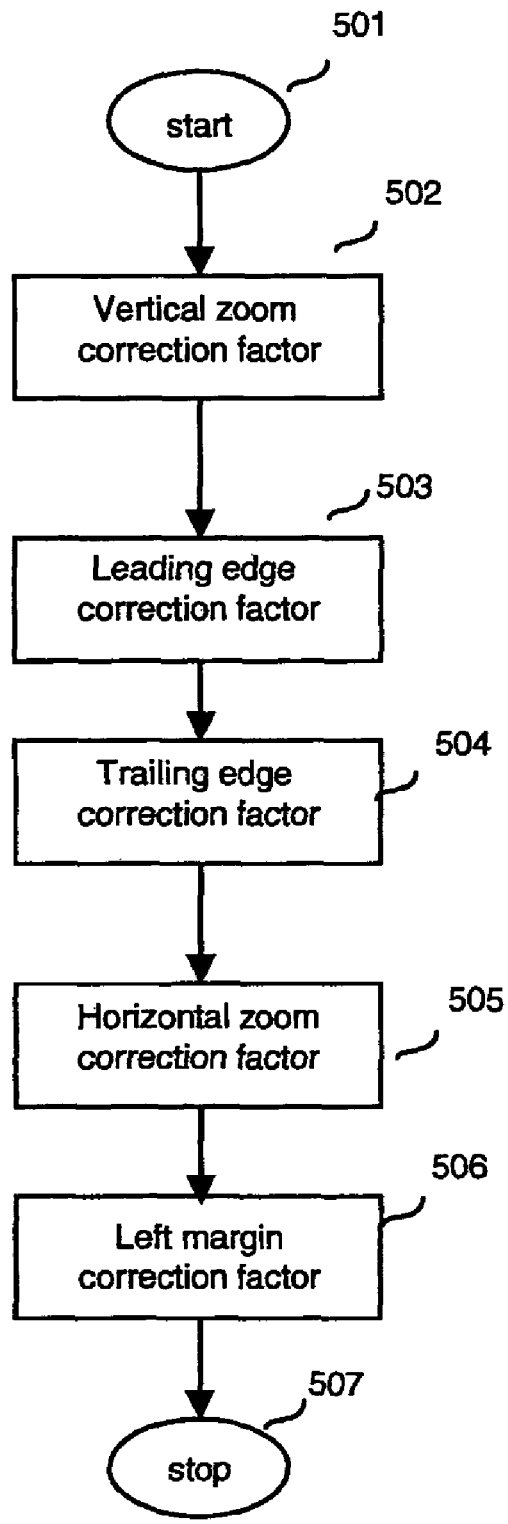
FIG. 5 is a flow chart showing an embodiment of the method of the present invention.

FIG. 5 illustrates a flow chart of the analysis program. After initiation of the procedure in step 501, in step 502, the distance expressed in pixels between the leading edge and the trailing edge as defined by the outer sides of the rectangular shapes 204, 206 and 205, 207 (FIG. 2) is determined from the bitmap. This distance is then calculated to a distance in millimeters on paper when printed. The distance in millimeters is compared with the predetermined actual distance in millimeters on the test original. A correction value expressed as a percentage is then returned to the scanner. In accordance with this correction value, the transport speed of the scanner is corrected. Next, in step 503 the distance between the very first line in the bit map and the first side of the first black areas is determined. Given the transport speed in the calibration mode, the timing of the start of transport by the first nip and the timing of reading out the first line from the CCD, the actual distance between the start position of the leading edge (FIG. 1, A) and the exposure slit is calculated. From the determined distance and the transport speed in normal mode the timing of control signal start CCD readout is calculated such that in normal mode the reading out of the CCD will start at precisely the moment when the leading edge of the original sheet passes the exposure slit.

In step 504 of the procedure, the timing of the trailing edge is derived from the bitmap and compared with the deactivation of the original detector (cf. FIG. 1). From the time difference, and through knowing the transport speed, the actual distance in millimeters between the original detector and the exposure slit is calculated. For any other transport speed, the timing for stopping the reading out of the CCD can now be calculated.

In step 505, the distance expressed in pixels between the two vertical lines of rectangle 212 is determined. This distance, expressed in pixels, is converted to a distance in millimeters on paper when printed. This calculated distance is compared with the predetermined actual distance in millimeters on the original test chart. A correction value, as a percentage of paper width, is returned to the scanner. In accordance with this correction value, a scaling algorithm in the scanning direction can be applied. Next, in step 506 the distance in the bitmap between the first pixel in a line and the vertical black areas at the left is measured. This will give the actual distance in pixels between the physical left margin guiding means and the first pixel along the CCD array. A correction value expressed in pixels is returned to the scanner. In a normal scanning run, a number of leading pixels in a line will be discarded, in accordance with the correction value so determined. Finally, in step 507 the procedure exits.

By way of further deviation from the above, calibration may be terminated earlier for various reasons. A first one will be caused by the operator pushing the STOP button sometime during the calibration procedure. This will be effected by an ABORT from the scanner followed by a STOP request from the controller. Further terminations may arise as being caused by Setmemory full event (from controller to scanner), Disk full event (from controller to scanner), a STOP TEST as initiated by an operator, either before scanning has effectively started, during the scanning proper, during the analysis annex computation of the parameters, or while setting the parameters after calculation. Another reason could be a failed analysis, so that no parameter values will be found. Finally, the eventual parameters may be denied or refused by scanner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for calibrating a transport scanner apparatus arranged for scanning a two-dimensional original and forming an electronic image thereof for subsequent usage in an information handling system, which comprises:
    scanning a test original, provided with a test image, by moving the test original along an optical arrangement fixedly mounted to the apparatus;
    forming an electronic image thereof, the test image containing at least one marking at a predetermined position;
    said scanning and forming of the electronic image being executed under the control of mechanical device parameters that control the process of making a mapping from an image on the 2-dimensional original to the electronic image in memory; and
    in continuation of the scanning of the test original, automatically calibrating the apparatus based on said at least one marking in the electronic bit map image formed therefrom, wherein a zoom factor is utilized in the transport direction, said zoom factor being a mechanical device parameter, and wherein the test original contains a leading edge and comprises two sides of at least one marking in known parallel displacement and parallel with the leading edge by assessing a correction value for the zoom factor based on the actual parallel displacement of the two sides in the electronic image, and without a need for printing out the test original,
    wherein the apparatus features a left or right margin position stop, and the method further comprises:
    utilizing a marking of the test original with one side of the marking flush with a left or right edge of the test original parallel to the transport direction,
    for each line, initiating recording at a first available pixel element of a CCD or stopping recording at a last available pixel element, and
    assessing a correction value for the left or right margin signal based on a difference between the first or last available pixel element and the one side of the marking, with the one side being flush with the left or the right edge of the test original, respectively.

2. The method as claimed in claim 1, wherein at least one marking on the test image has at least one side flush with an edge of the test original; and in the step of scanning the test original, a greater area than the area of the test original is scanned.

3. The method as claimed in claim 2, wherein the CCD is used for scanning the two-dimensional original and features a leading edge timing signal for initiating the read out of the CCD, wherein
    the test original contains a marking with one side flush with the leading edge and wherein assessing a correction value for the leading edge timing signal is assessed based on the position of the one side in the electronic image in relation to the actually used leading edge timing signal.

4. The method as claimed in claim 2, wherein the CCD is used for scanning the two-dimensional original and features a trailing edge timing signal for stopping the read out of the CCD, wherein
    the test original contains a marking with one side flush with the trailing edge; and wherein a correction value for the trailing edge timing signal is assessed based on the position of the one side in the electronic image in relation to the actually used leading edge timing signal.

5. The method according to claim 1, in which the zoom factor is perpendicular to the transport direction, wherein
    the test original comprises two sides of at least one marking parallel to the transport direction, and wherein
    a correction value for the zoom factor perpendicular to the transport direction is assessed, based on a ratio of the distance between the two sides in the electronic image and the actual distance on the test original.

6. The method of claim 1, wherein the test original is made of a material that has an appropriately conforming and constant size, and carries at least one marking for automatically calibrating the apparatus.

7. The method according to claim 6, wherein markings with a side flush with an edge of the test original are obtained by cutting the corresponding edge of the test original.

8. An apparatus having a transport scanner facility for scanning a two-dimensional original and for forming an electronic image thereof for subsequent usage in an information handling system, said apparatus comprising:
    means for moving the original along an optical arrangement fixedly mounted to the apparatus;
    means for scanning and forming under the control of mechanical device parameters that control the process of making a mapping from an image on the 2-dimensional original to an electronic image in memory;
    calibration means for calibrating mechanical device parameters that control the scanning operation by means of a test original, wherein said calibration means includes processing means for processing the electronic image obtained by scanning the test original for deriving from at least one marking in the electronic image correction values for the mechanical device parameters, wherein a zoom factor is utilized in the transport direction, said zoom factor being a mechanical device parameter, and wherein the test original contains a leading edge and comprises two sides of at least one marking in known parallel displacement and parallel with the leading edge, by assessing a correction value for the zoom factor based on the actual parallel displacement of the two sides of the electronic image, and
    means for, in continuation of the scanning of the test original, correcting the device parameters based on the derived correction values, and without a need for printing out the test original, wherein the apparatus features a left or right margin position stop, and wherein
   the test original utilizes a marking with one side flush with the left or right edge of the test original parallel to the transport direction,
   for each line, recording is initiated at a first available pixel element of a CCD or recording is stopped at a last available pixel element, and
   a correction value for the left or right margin signal is assessed based on a difference between the first or last available pixel element and the one side of the marking, with the one side being flush with the left or the right edge of the test original, respectively.

* * * * *